US009460205B2

(12) United States Patent
Hughes

(10) Patent No.: US 9,460,205 B2
(45) Date of Patent: *Oct. 4, 2016

(54) CROWDSOURCED VIDEO COLLABORATION

(75) Inventor: Ronald Paul Hughes, Santa Cruz, CA (US)

(73) Assignee: GOOGLE INC., Mountain View, CA (US)

(*) Notice: Subject to any disclaimer, the term of this patent is extended or adjusted under 35 U.S.C. 154(b) by 134 days.

This patent is subject to a terminal disclaimer.

(21) Appl. No.: 13/554,931

(22) Filed: Jul. 20, 2012

(65) Prior Publication Data

US 2014/0025754 A1   Jan. 23, 2014

(51) Int. Cl.
G06F 15/16 (2006.01)
G06F 17/30 (2006.01)

(52) U.S. Cl.
CPC .............................. *G06F 17/30817* (2013.01)

(58) Field of Classification Search
CPC .......... G06F 15/16; G06F 8/30; G06F 17/00; G06F 17/30861; G06F 3/0237; G06F 17/30241; G06F 17/3074; H04L 65/403; H04L 65/80; H04L 65/1083; H04L 65/1069; H04L 65/1016; H04L 65/4076
See application file for complete search history.

(56) References Cited

U.S. PATENT DOCUMENTS

| | | |
|---|---|---|
| 8,526,985 B2 | 9/2013 | Cilli et al. |
| 2001/0003188 A1* | 6/2001 | Kikinis ........................ 709/203 |
| 2005/0257240 A1 | 11/2005 | Faulkner et al. |
| 2007/0008321 A1 | 1/2007 | Gallagher et al. |
| 2008/0132251 A1* | 6/2008 | Altman et al. ................ 455/457 |
| 2008/0140720 A1* | 6/2008 | Six et al. .................... 707/104.1 |
| 2009/0055385 A1 | 2/2009 | Jeon et al. |
| 2009/0125584 A1 | 5/2009 | Agrawala et al. |
| 2010/0130226 A1 | 5/2010 | Arrasvuori et al. |
| 2010/0131443 A1 | 5/2010 | Agarwal et al. |
| 2010/0274816 A1 | 10/2010 | Guzik |
| 2011/0040760 A1 | 2/2011 | Fleischman et al. |
| 2012/0027256 A1 | 2/2012 | Kiyohara et al. |
| 2012/0224021 A1 | 9/2012 | Begeja et al. |
| 2012/0233000 A1 | 9/2012 | Fisher et al. |
| 2012/0290953 A1* | 11/2012 | Russell et al. ................ 715/758 |
| 2013/0018896 A1 | 1/2013 | Fleischman et al. |
| 2013/0054693 A1 | 2/2013 | Chennamadhavuni |
| 2013/0073400 A1 | 3/2013 | Heath |
| 2013/0102327 A1* | 4/2013 | Mate ..................... H04W 24/00 455/456.1 |
| 2013/0173531 A1* | 7/2013 | Rinearson et al. .......... 707/608 |
| 2013/0303198 A1 | 11/2013 | Sadasivam et al. |
| 2013/0337830 A1 | 12/2013 | Haro et al. |
| 2014/0052738 A1 | 2/2014 | Connell-Giammatteo et al. |
| 2014/0195625 A1 | 7/2014 | Weldon |
| 2014/0350970 A1 | 11/2014 | Schumann, Jr. et al. |
| 2014/0372436 A1* | 12/2014 | Makki et al. ................ 707/736 |

OTHER PUBLICATIONS

International Search Report of the International Searching Authority for PCT/US2013/051268 mailed Dec. 23, 2013.
Written Opinion of the International Searching Authority for PCT/US2013/051268 mailed Dec. 23, 2013.

* cited by examiner

*Primary Examiner* — Djenane Bayard
(74) *Attorney, Agent, or Firm* — Lowenstein Sandler LLP

(57) ABSTRACT

Methods and systems for identifying video clips in a video clip repository that are of the same event are disclosed. Video clips are identified as being of the same event based on timestamps and geolocation stamps associated with the video clips. In one embodiment, authors of video clips receive messages that notify them of the existence of other video clips of the same event.

21 Claims, 6 Drawing Sheets

CROWDSOURCED VIDEO COLLABORATION

TECHNICAL FIELD

Embodiments of the present invention relate to data processing, and more specifically, to managing video clips or other types of data.

BACKGROUND

Video is becoming pervasive on the World Wide Web. In addition to content providers (e.g., news organizations, media companies, etc.) providing a wealth of video clips on their websites, everyday users are uploading user-generated video clips to various repository websites. In addition, users of such websites may "follow" other users in the same way as users of social networking services and conveniently view video clips uploaded by or recommended by these other users. User-generated video clips are typically recorded with digital video cameras, digital still cameras that have video capability, and increasingly, wireless terminals (e.g., smartphones, etc.) that have still camera and video capabilities.

SUMMARY

In an embodiment of the present invention, a computer system identifies video clips of an event (e.g., a wedding, a sports event, an everyday scene, etc.) based on timestamps and geolocation stamps of the video clips, and transmits a message that indicates the existence of the video clips.

BRIEF DESCRIPTION OF THE DRAWINGS

Embodiments of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
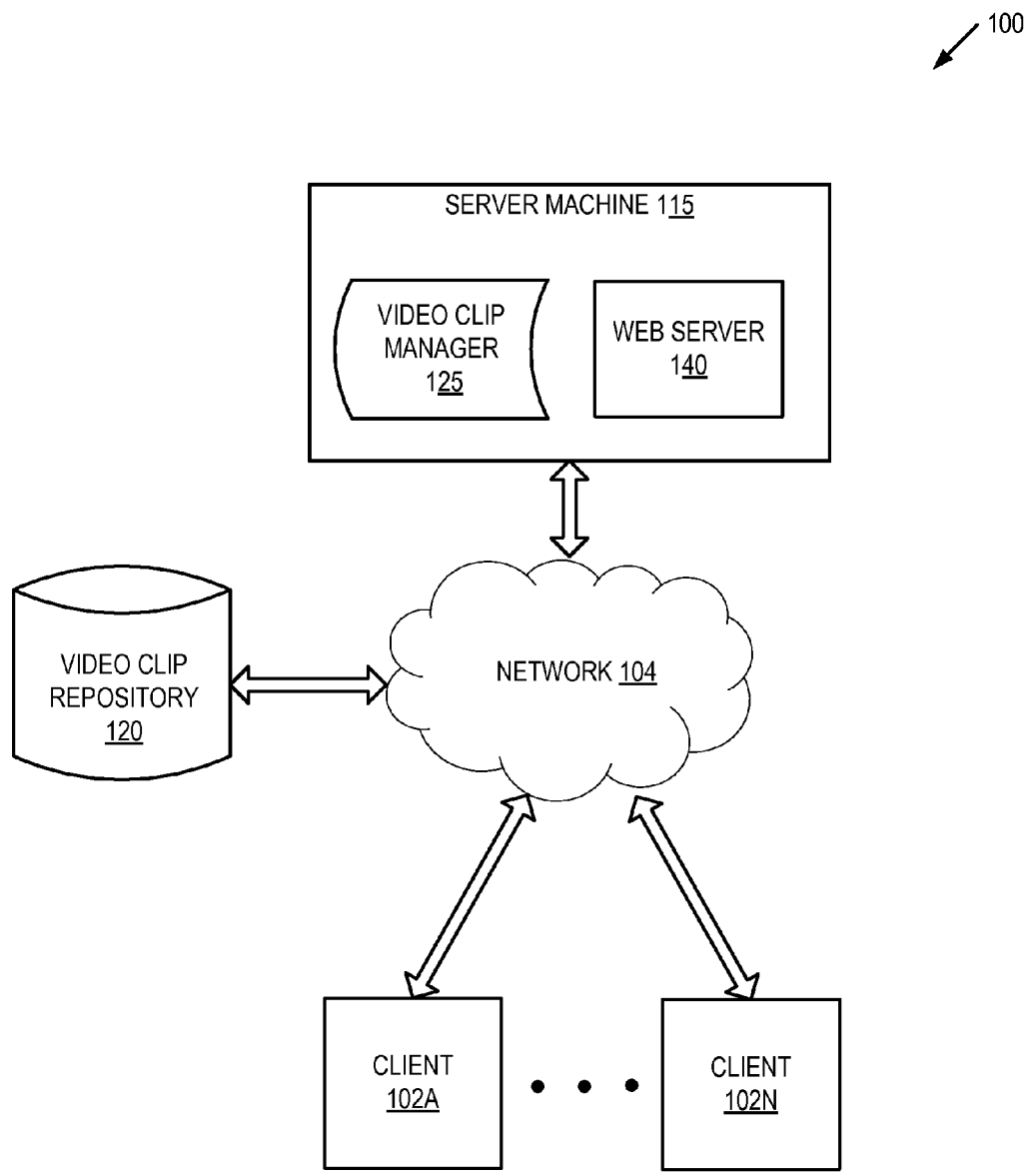
FIG. 1 illustrates an exemplary system architecture, in accordance with one embodiment of the present invention.

Embodiments of the present invention take advantage of the fact that wireless terminals (e.g., smartphones, etc.) may have geolocation capabilities such as Global Positioning System [GPS] receivers, location estimation via Wi-Fi hotspots, etc., and may assign timestamps and geolocation stamps to video clips recorded by the terminal. In particular, methods and systems are described for identifying video clips in a video clip repository that are of the same event, based on the timestamps and geolocation stamps of the video clips.

In an embodiment of the present invention, a computer system determines that a set of two or more video clips are of the same event (e.g., a wedding, a sports event, an everyday scene, etc.) when the timestamps and geolocation stamps match, within suitable thresholds. For example, if two video clips have respective timestamps of 2:03-3:05 pm and 2:01-2:56 pm and their geo-location stamps are within 20 meters of each other, then the computer system might identify the two video clips as being of the same event. As another example, two video clips that have respective timestamps of 10:20-10:52 am and 10:30-10:40 am and respective geo-location stamps within 10 meters of each other might also be identified as being of the same event.

In one embodiment, a computer system pre-processes the existing video clips in a video clip repository by identifying, based on timestamps and geolocation stamps, video clips that are "related" to one another (i.e., that are of the same event). The computer system then sends a message to each author of a video clip in the repository, inquiring whether the author grants permission to:

notify the authors of related video clips of the existence of the video clip, and notify followers of these authors of the existence of the video clip.

For example, if Mary Jones has uploaded a video clip of his brother John's wedding to a video clip repository, Mary will receive a message that inquires whether she gives permission to notify the authors of other video clips of John Jones' wedding (e.g., Mary's cousin Betty, etc.) of the existence of her video clip, as well as whether she gives permission for followers of these other authors to also be notified of the existence of the video clip.

In accordance with this embodiment, the computer system receives responses to these messages and, as allowed by the permissions, sends messages that notify authors, and possibly followers of the authors, of the existence of related video clips (i.e., video clips of the same event). Similarly, when a new video clip is uploaded to the repository, the author of the new video clip is asked, in the same manner as in the pre-processing stage, whether he or she grants permission to notify related authors, and their followers, of the existence of the new video clip. The computer system then notifies, as allowed by permissions, the authors of related video clips (and possibly their followers) of the existence of the new video clip, and notifies, as allowed by permissions, the author of the new video clip of the existence of related video clips.

In one embodiment, the computer system is also capable of perform image processing on related video clips (e.g., color balancing, contrast balancing, brightness balancing, etc.). Such image processing can result in a more consistent appearance across related video clips (e.g., to improve chromatic consistency across the video clips, etc.), which is particularly desirable when related video clips are combined and edited into a single video clip. In accordance with this embodiment, the author of the video clip is asked for his or her permission for the video clip to be processed, in addition to permission to notify authors of related video clips and their followers.

Embodiments of the present invention thus provide a collaborative environment in which video clips of an event can be easily discovered and shared among users who attended and recorded the event, while respecting the privacy wishes of individual users. Moreover, while embodiments of the present invention are described with reference to video clips, embodiments of the present invention also apply to other types of content, such as still photographs, audio clips, textual transcripts (e.g., of depositions, etc.), and so forth.

FIG. 1 illustrates an example system architecture 100, in accordance with one embodiment of the present invention. The system architecture 100 includes a server machine 115, a video clip repository 120 and client machines 102A-102N connected to a network 104. Network 104 may be a public network (e.g., the Internet), a private network (e.g., a local area network (LAN) or wide area network (WAN)), or a combination thereof.

The client machines 102A-102N may be wireless terminals (e.g., smartphones, etc.), personal computers (PC), laptops, tablet computers, or any other computing or communication devices. The client machines 102A-102N may run an operating system (OS) that manages hardware and software of the client machines 102A-102N. A browser (not shown) may run on the client machines (e.g., on the OS of the client machines). The browser may be a web browser that can access content served by a web server. The browser may issue image and/or video search queries to the web server or may browse images and/or videos that have previously been classified. The client machines 102A-102N may also upload images and/or video to the web server for storage and/or classification.

Server machine 115 may be a rackmount server, a router computer, a personal computer, a portable digital assistant, a mobile phone, a laptop computer, a tablet computer, a camera, a video camera, a netbook, a desktop computer, a media center, or any combination of the above. Server machine 115 includes a web server 140 and a video clip manager 125. In alternative embodiments, the web server 140 and video clip manager 125 may run on different machines.

Video clip repository 120 is a persistent storage that is capable of storing video clips and other types of content (e.g., images, audio clips, text-based documents, etc.) as well as data structures to tag, organize, and index the video clips and other types of content. In some embodiments video clip repository 120 might be a network-attached file server, while in other embodiments video clip repository 120 might be some other type of persistent storage such as an object-oriented database, a relational database, and so forth, that may be hosted by the server machine 115 or one or more different machines coupled to the server machine 115 via the network 104. The video clips stored in the video clip repository 120 may include user-generated content that is uploaded by client machines. The video clips may additionally or alternatively include content provided by service providers such as news organizations, publishers, libraries and so on.

Web server 140 may serve images from video clip repository 120 to clients 102A-102N. Web server 140 may receive image search queries and perform searches on the images in the video clip repository 120 to determine images that satisfy the image search query. Web server 140 may then send to a client 102A-102N those images that match the search query.

In accordance with some embodiments, video clip manager 125 is capable of storing uploaded video clips in video clip repository 120, of indexing the video clips in video clip repository 120, of identifying video clips in video clip repository 120 that are related (i.e., that are of the same event), of requesting permission from users to notify other users of the existence of video clips and, if so allowed, notifying those other users, and of requesting permission from users to perform image processing (e.g., color balancing, etc.) on their video clips with respect to related video clips and, if so allowed, performing the image processing. In addition, video clip manager 125 provides users the opportunity to opt-out of having their timestamps and geolocation stamps collected and/or shared. An embodiment of video clip manager 125 is described in detail below and with respect to FIGS. 3 through 6.

Figure 2:
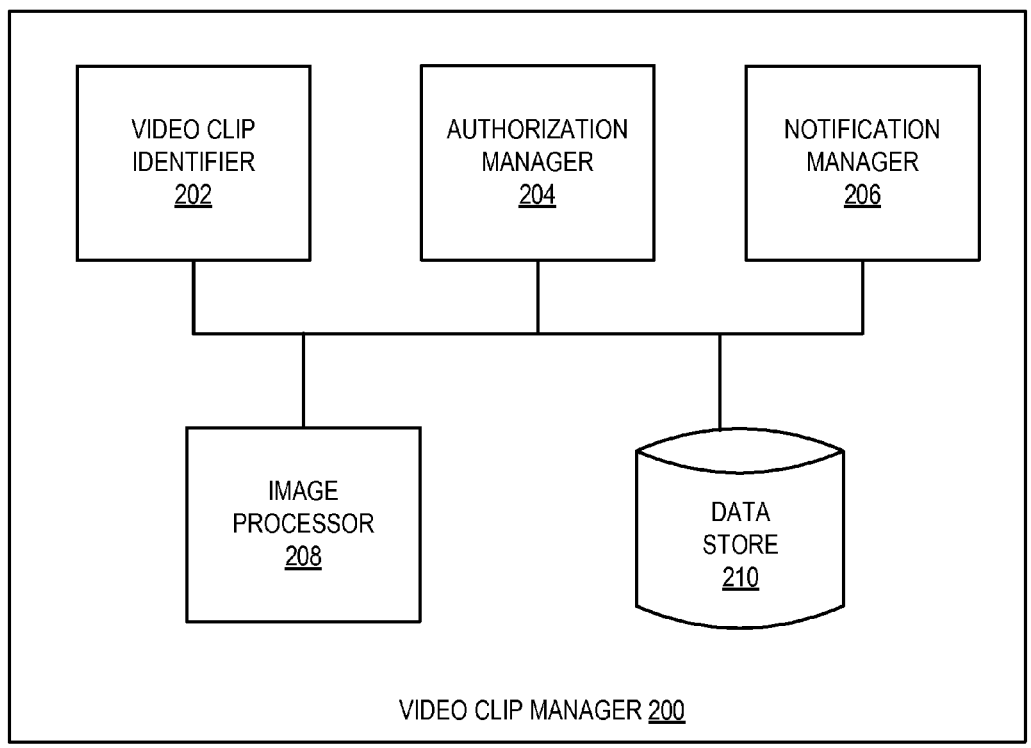
FIG. 2 is a block diagram of one embodiment of a video clip manager.

FIG. 2 is a block diagram of one embodiment of a video clip manager 200. The video clip manager 200 may be the same as the video clip manager 125 of FIG. 1 and may include a video clip identifier 202, an authorization manager 204, a notification manager 206, an image processor 208, and a data store 210. The components can be combined together or separated in further components, according to a particular embodiment.

The data store 210 may be a temporary buffer or a permanent data store to hold one or more video clips that are to be stored in video clip repository 120, one or more video clips that are to be processed, one or more data structures for tagging and indexing video clips in video clip repository 120, messages for requesting permissions from users, responses to these requests from users, user permissions specified in the responses, messages for notifying users of the existence of video clips, or some combination of these data. Alternatively, data store 210 may be hosted by one or more storage devices, such as main memory, magnetic or optical storage based disks, tapes or hard drives, NAS, SAN, and so forth. In one embodiment, the video clip manager 200 notifies users of the types of information that are stored in the data store 210 and provides the users the opportunity to opt-out of having such information collected and/or shared with the video clip manager 200.

The video clip identifier 202 identifies video clips in video clip repository 120 that are related (i.e., are of the same event) based on the timestamps and geolocation stamps of the video clips, and stores these relationships in video clip repository for rapid retrieval (e.g., as rows of a table in a relational database, as sets in an object-oriented database, etc.). In some embodiments, thresholds for determining whether two timestamps match and whether two geolocation stamps match may be established by a system administrator of server machine 115, while in some other embodiments such thresholds may be hard-coded into matching logic contained in video clip identifier 202, while in still some other embodiments these thresholds may be dynamically adjusted within video clip identifier 202 in response to empirical results, user feedback, information in tags that are applied to video clips, and so forth.

The authorization manager 204 requests permission from users to notify authors of related video clips (or "related authors") of the existence of video clips, to notify followers of related authors of the existence of video clips, and to perform image processing (e.g., color balancing, etc.) on video clips with respect to related video clips. In addition, authorization manager 204 receives responses to these permission requests from users, stores the permissions that are specified in these responses in video clip repository 120, and ensures that notification manager 206 and image processor 208 comply with these permissions.

The notification manager 206 sends messages, as allowed by authorization manager 206, to notify authors of video clips of the existence of related video clips, and to notify followers of authors of the existence of related video clips. In some embodiments, notification manager may send simple notification messages, while in some other embodiments notification manager 206 may include additional information in the notification messages such as hypertext links to the related video clips, the number of views of the related video clips, and so forth. In some embodiments, notification manager 206 also notifies an author of a video clip of the existence and location of an image-processed version of the video clip, as authorized by the author.

The image processor 208 processes the picture elements (pixels) of frames of related video clips (for example, by performing a global adjustment of the intensities of the colors in the related video clips via chromatic adaptation, Retinex-based algorithms, etc.) in order to provide greater consistency (e.g., of color tones, of brightness, of contrast, etc.) across the video clips. In some embodiments the processed version of a video clip may be stored in video clip repository 120 in addition to the original video clip, while in some other embodiments the processed version of a video clip may replace the original video clip. Moreover, in embodiments in which metadata for a video clip indicate the make and model of the device that recorded the video clip (e.g., a specific tablet, a smart phone, etc.), the image processing may be based, at least in part, on this information.

Figure 3:
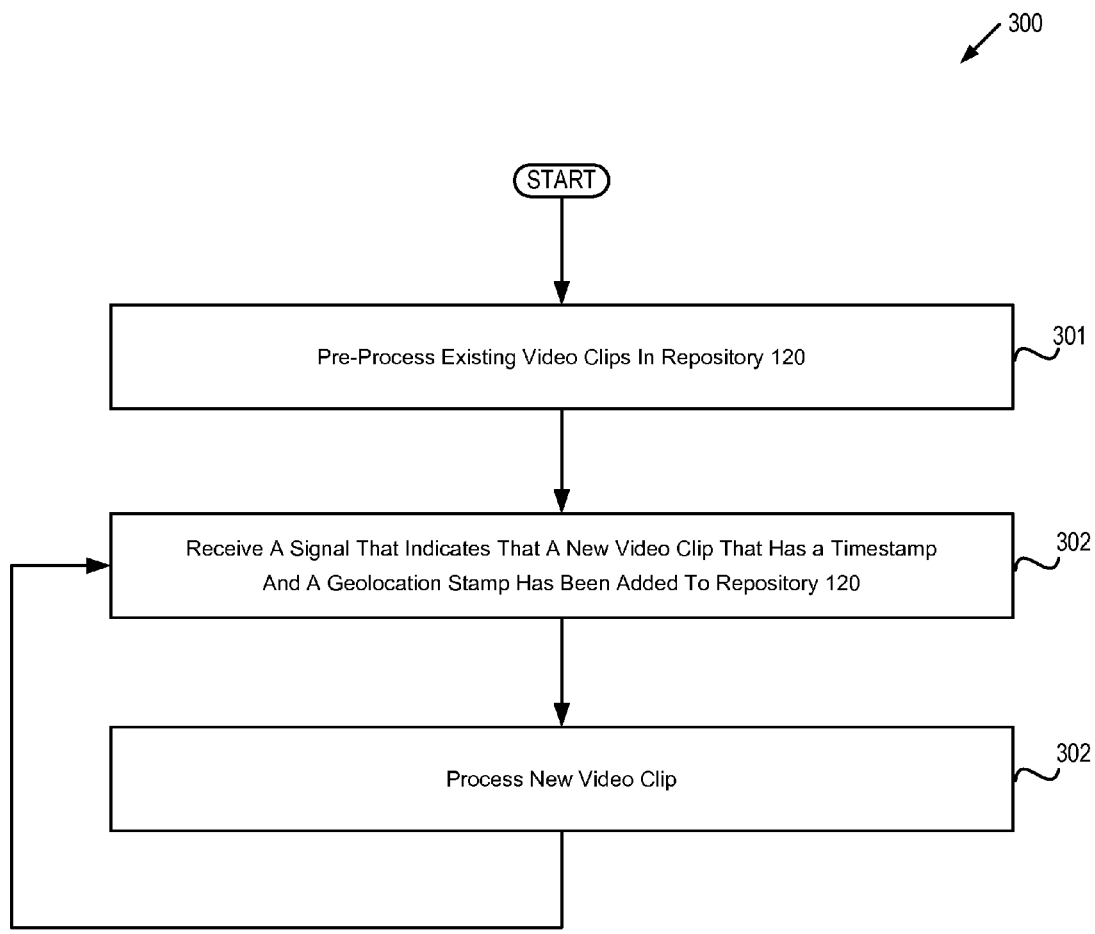
FIG. 3 depicts a flow diagram of one embodiment of a method for managing a video clip repository.

FIG. 3 depicts a flow diagram of one embodiment of a method 300 for managing video clips in video clip repository 120. The method is performed by processing logic that may comprise hardware (circuitry, dedicated logic, etc.), software (such as is run on a general purpose computer system or a dedicated machine), or a combination of both. In one embodiment, the method is performed by the server machine 115 of FIG. 1, while in some other embodiments, one or more of blocks 301 through 303 might be performed by another machine. It should be noted that in some embodiments, various components of video clip manager 200 may run on separate machines (e.g., image processor 208 might run on one machine while video clip identifier 202, authorization manager 204, and notification manager 206 might run on another machine, etc.).

At block 301, existing video clips in repository 120 are pre-processed. An embodiment of block 301 is described in more detail below and with respect to FIG. 4. In accordance with one embodiment, block 301 is performed by video clip manager 125.

At block 302, a signal is received that indicates that a new video clip having a timestamp and a geolocation stamp has been added to video clip repository 120. In accordance with one embodiment, the signal is generated by web server 140 and transmitted to video clip manager 125.

At block 303, the new video clip is processed. An embodiment of block 303 is described in more detail below and with respect to FIG. 5. In accordance with one embodiment, block 303 is performed by video clip manager 125. After block 303, execution continues back at block 302.

Figure 4:
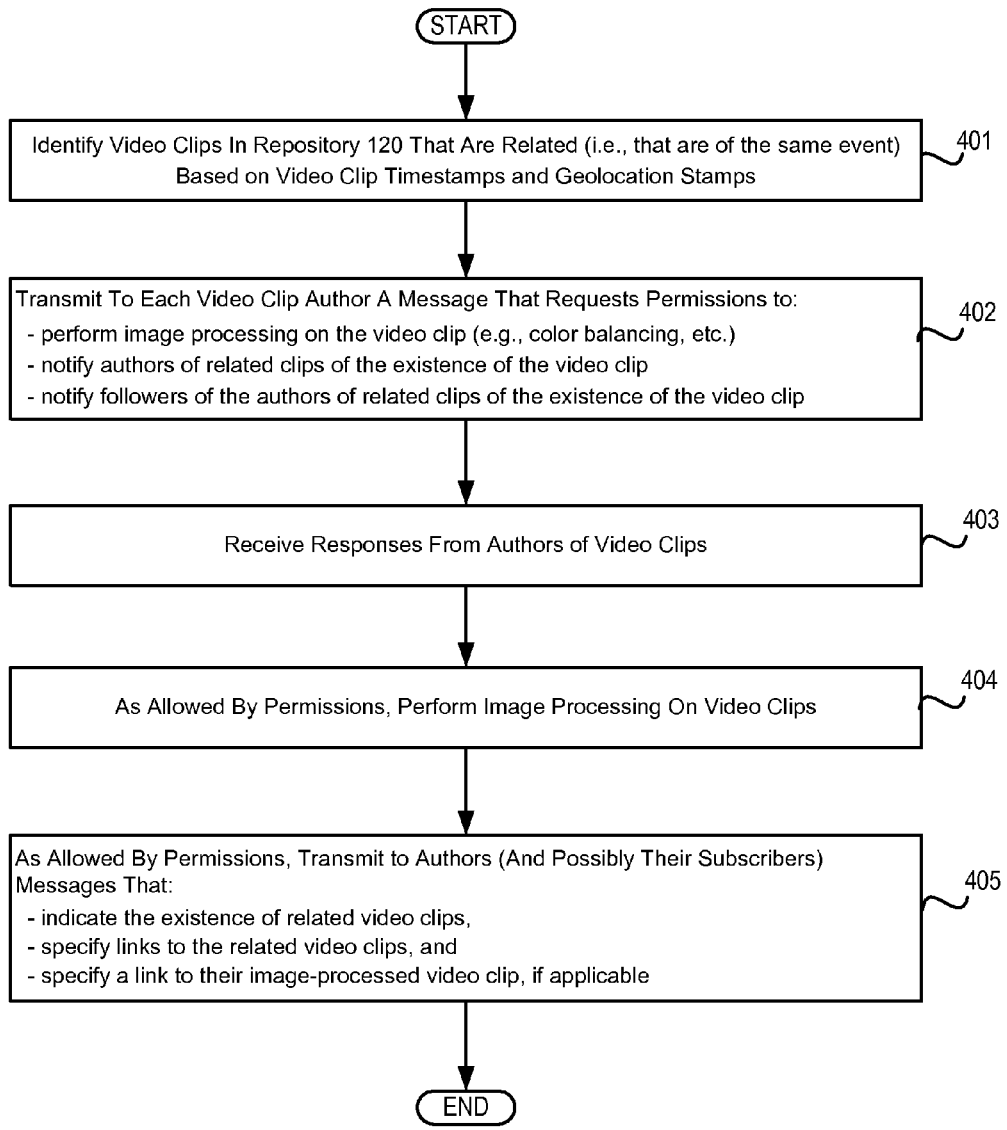
FIG. 4 depicts a flow diagram of one embodiment of a method for pre-processing existing video clips in a video clip repository.

FIG. 4 depicts a flow diagram of one embodiment of a method for pre-processing existing video clips in video clip repository 120.

At block 401, video clips in repository 120 that are related (i.e., that are of the same event) are identified based on the timestamps and geolocation stamps. In accordance with one embodiment, block 401 is performed by video clip identifier 202. As described above, in some embodiments one or both of a time difference threshold and a geolocation difference threshold might be employed at block 401 in the determination of whether the timestamps and geolocation stamps of two or more video clips "match." It should be noted that a variety of techniques may be employed in block 401 to identify related video clips in repository 120, such as clustering, quantization and linear-time sorting, and so forth.

At block 402, a message is transmitted to each author of a video clip in repository 120. The message requests permissions from the author to:
  perform image processing on the new video clip,
  notify authors of related clips of the existence of the video clip, and
  notify followers of the authors of related clips of the existence of the video clip.
In one embodiment, block 402 is performed by authorization manager 204 by sending the author an email with a link to a webpage that contains checkboxes for each of these permission items.

At block 403, responses are received from the authors. In one embodiment, authorization manager 204 receives the responses and stores the permissions in video clip repository 120.

At block 404, as allowed by the author permissions, image processing of video clips in repository 120 is performed. In one embodiment, image processing is performed by image processor 208 and author permissions are enforced by authorization manager 204. As described above, in some embodiments the processed version of a video clip may be stored in video clip repository 120 in addition to the original video clip, while in some other embodiments the processed version of a video clip may replace the original video clip. Moreover, in embodiments in which metadata for a video clip indicate the make and model of the device that recorded the video clip (e.g., a specific tablet, a smart phone, etc.), the image processing may be based, at least in part, on this information.

At block 405, as allowed by author permissions, messages are transmitted to authors, and possibly their subscribers, where the messages:
  indicate the existence of related video clips,
  specify links to the related video clips, and
  specify a link to the author's image-processed video clip, if applicable.
In one embodiment, the messages are sent to authors by notification manager 206 and author permissions are enforced by authorization manager 204.

Figure 5:
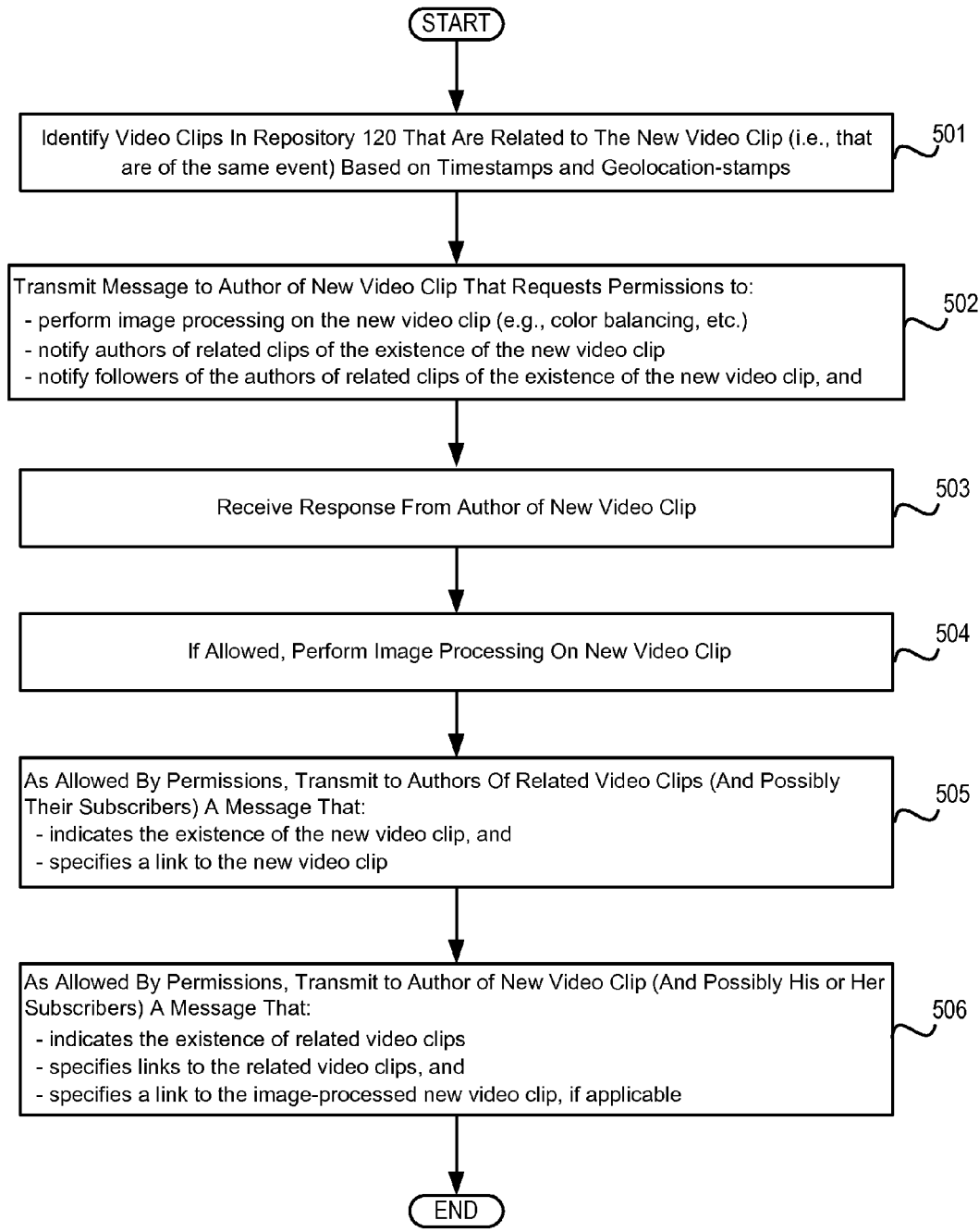
FIG. 5 depicts a flow diagram of one embodiment of a method for processing a new video clip that is added to a video clip repository.

FIG. 5 depicts a flow diagram of one embodiment of a method for processing a new video clip that is added to a video clip repository.

At block 501, video clips in repository 120 that are related (i.e., that are of the same event) to the new video clip are identified based on timestamps and geolocation stamps, as described above for block 401. In accordance with one embodiment, block 501 is performed by video clip identifier 202.

At block 502, a message is transmitted to the author of the new video clip that requests permissions from the author to:
  perform image processing on the new video clip,
  notify authors of related clips of the existence of the new video clip, and
  notify followers of the authors of related clips of the existence of the new video clip.
In one embodiment, block 502 is performed by authorization manager 204 by sending the author of the new video clip an email with a link to a webpage that contains checkboxes for each of these permission items.

At block 503, a response is received from the author of the new video clip. In one embodiment, authorization manager 204 receives the response and stores the permissions in video clip repository 120.

At block 504, if allowed by the author of the new video clip, image processing is performed on the new video clip. As described above, in some embodiments the processed version of the new video clip may be stored in video clip repository 120 in addition to the original version of the new video clip, while in some other embodiments the processed version may replace the original. Moreover, in embodiments in which metadata for a video clip indicate the make and model of the device that recorded the video clip (e.g., a specific tablet, a smart phone, etc.), the image processing may be based, at least in part, on this information.

At block 505, as allowed by author permissions, messages are transmitted to authors of related video clips, and possibly their subscribers, where the messages:
  indicate the existence of the new video clip, and
  specify a link to the new video clip (which may or may not be processed, based on the author's permission).
In one embodiment, the messages are sent to authors by notification manager 206 and author permissions are enforced by authorization manager 204.

At block 506, as allowed by author permissions, messages are transmitted to the author of the new video clip, and possibly his or her subscribers, where the messages:
  indicate the existence of related video clips,
  specify links to the related video clips, and
  specify a link to the processed version of the new video clip, if applicable.

Figure 6:
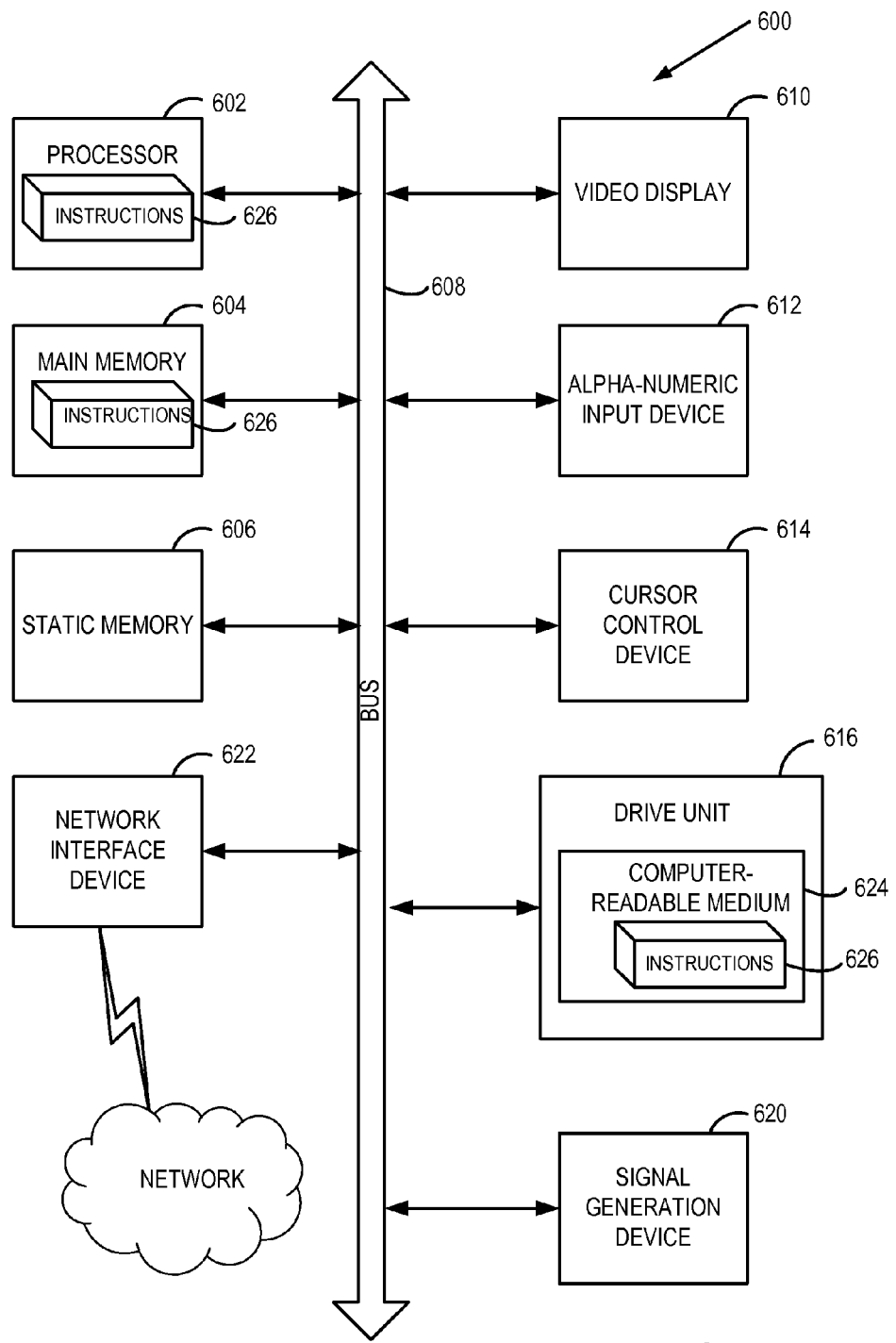
FIG. 6 depicts a block diagram of an illustrative computer system operating in accordance with embodiments of the invention.

FIG. 6 illustrates an exemplary computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing system (processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 616, which communicate with each other via a bus 608.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute instructions 626 for performing the operations and steps discussed herein.

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 616 may include a computer-readable medium 624 on which is stored one or more sets of instructions 626 (e.g., instructions executed by video clip manager 125 and corresponding to blocks 401 through 405 and 501 through 506, etc.) embodying any one or more of the methodologies or functions described herein. Instructions 626 may also reside, completely or at least partially, within the main memory 604 and/or within the processor 602 during execution thereof by the computer system 600, the main memory 604 and the processor 602 also constituting computer-readable media. Instructions 626 may further be transmitted or received over a network via the network interface device 622.

While the computer-readable storage medium 624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying," "transmitting," "determining," "computing," "receiving," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Moreover, the techniques described above could be applied to other types of data instead of, or in addition to, video clips (e.g., images, audio clips, textual documents, web pages, etc.). The scope of the invention should, therefore, be determined with reference to the appended claims, along with the full scope of equivalents to which such claims are entitled.

What is claimed is:

1. A method comprising:
    determining, by a computer system, that a plurality of video clips of a first set of users are of a same event, based on timestamps and geolocation stamps of the video clips, wherein the timestamps and geolocation stamps of the video clips match within one or more thresholds;
    identifying at least one additional video clip of a second user, wherein the at least one additional video clip is of the same event as the plurality of video clips of the first set of users, wherein the second user is not part of the first set of users;
    in response to identifying the at least one additional video clip of the same event as the plurality of video clips, requesting a permission of the second user to notify one or more of the first set of users about an existence of the at least one additional video clip of the same event; and
    upon receiving the permission of the second user to notify the one or more of the first set of users about the existence of the at least one additional video clip of the same event, transmitting, to the one or more of the first set of users and in view of the permission, a message that indicates the existence of the at least one additional video clip of the same event.

2. The method of claim 1 wherein the message also specifies a link to the at least one additional video clip.

3. The method of claim 1 wherein the first set of users comprises an author of one or more of the plurality of video clips, and wherein the message indicates the existence of the at least one additional video clip that is not authored by the author of the one or more of the plurality of video clips.

4. The method of claim 1 wherein the first set of users comprises a user who follows an author of one or more of the plurality of video clips.

5. The method of claim 1 wherein the at least one additional video clip is recorded by a wireless terminal and is transmitted with a timestamp and a geolocation stamp to the computer system.

6. The method of claim 1 wherein the determining is in response to receiving a video clip from a wireless terminal.

7. The method of claim 1 further comprising performing image processing on the plurality of video clips.

8. An apparatus comprising:
    a network interface device; and
    a processor to:
    determine that a plurality of video clips of a first set of users are of a same event, based on timestamps and geolocation stamps of the video clips, wherein the timestamps and geolocation stamps of the video clips match within one or more thresholds;
    identify at least one additional video clip of a second user, wherein the at least one additional video clip is of the same event as the plurality of video clips of the first set of users, wherein the second user is not part of the first set of users;
    in response to identifying the at least one additional video clip of the same event as the plurality of video clips, request a permission of the second user to notify one or more of the first set of users about an existence of the at least one additional video clip of the same event; and
    receive the permission of the second user to notify the one or more of the first set of users about the existence of the at least one additional video clip of the same event; and
    transmit, to the one or more of the first set of users and in view of the permission, a message that indicates the existence of the at least one additional video clip of the same event.

9. The apparatus of claim 8 wherein the message also specifies a link to the at least one additional video clip.

10. The apparatus of claim 8 wherein the first set of users comprises an author of one or more of the plurality of video clips, and wherein the message indicates the existence of the at least one additional video clip that is not authored by the author of the one or more of the plurality of video clips.

11. The apparatus of claim 8 wherein the first set of users comprises a user who follows an author of one or more of the plurality of video clips.

12. The apparatus of claim 8 wherein the at least one additional video clip is recorded by a wireless terminal and is transmitted with a timestamp and a geolocation stamp to the apparatus.

13. The apparatus of claim 8 wherein the determining is in response to receiving a video clip from a wireless terminal.

14. The apparatus of claim 8 further comprising performing image processing on the plurality of video clips.

15. A non-transitory computer-readable storage medium, having instructions stored therein, which when executed, cause a computer system to perform a method comprising:
   determining, by the computer system, that a plurality of video clips of a first set of users are of a same event, based on timestamps and geolocation stamps of the video clips, wherein the timestamps and geolocation stamps of the video clips match within one or more thresholds;
   identifying at least one additional video clip of a second user, wherein the at least one additional video clip is of the same event as the plurality of video clips of the first set of users, wherein the second user is not part of the first set of users;
   in response to identifying the at least one additional video clip of the same event as the plurality of video clips, requesting a permission of the second user to notify one or more of the first set of users about an existence of the at least one additional video clip of the same event; and
   upon receiving the permission of the second user to notify the one or more of the first set of users about the existence of the at least one additional video clip of the same event, transmitting, to the one or more of the first set of users and in view of the permission, a message that indicates the existence of the at least one additional video clip of the same event.

16. The non-transitory computer-readable storage medium of claim 15 wherein the message also specifies a link to the at least one additional video clip.

17. The non-transitory computer-readable storage medium of claim 15 wherein the first set of users comprises an author of one or more of the plurality of video clips, and wherein the message indicates the existence of the at least one additional video clip that is not authored by the author of the one or more of the plurality of video clips.

18. The non-transitory computer-readable storage medium of claim 15 wherein the first set of users comprises a user who follows an author of one or more of the plurality of video clips.

19. The non-transitory computer-readable storage medium of claim 15 wherein the at least one additional video clip is recorded by a wireless terminal and is transmitted with a timestamp and a geolocation stamp to the computer system.

20. The non-transitory computer-readable storage medium of claim 15 wherein the determining is in response to receiving a video clip from a wireless terminal.

21. The non-transitory computer-readable storage medium of claim 15 wherein the method further comprises performing image processing on the plurality of video clips.

* * * * *